UNITED STATES PATENT OFFICE.

HELON B. MacFARLAND, OF CHICAGO, ILLINOIS, AND ROBERT JAY SHOEMAKER, OF TOPEKA, KANSAS, ASSIGNORS, BY DIRECT AND MESNE ASSIGNMENTS, OF ONE-HALF TO SAID MacFARLAND AND ONE-HALF TO EGBERT H. GOLD, OF CHICAGO, ILLINOIS.

MATERIAL FOR DEADENING SOUND AND OTHER PURPOSES AND METHOD OF MAKING SAME.

1,333,624. Specification of Letters Patent. Patented Mar. 16, 1920.

No Drawing. Application filed January 3, 1916. Serial No. 69,946.

*To all whom it may concern:*

Be it known that we, HELON B. MACFARLAND and ROBERT J. SHOEMAKER, citizens of the United States, residing at Chicago, in the county of Cook and State of Illinois, and Topeka, in the county of Shawnee and State of Kansas, respectively, have invented certain new and useful Improvements in Material for Deadening Sound and other Purposes and Methods of Making Same, of which the following is a specification.

Our invention relates to the production of a coherent body of fibrous material for sound deadening or other purposes.

One of the objects of the invention is to produce a material suitable for forming sound deadening pads which are interposed between the tie plates and ties on elevated roads, in subways, or in other situations where it is desirable to deaden the noise produced by movement of the trains over the track. A material to serve this purpose should be very elastic so that it will not be permanently compacted and rendered useless by the pressures to which it is subjected. It should also be tough in its texture and relatively hard superficially at least, and at the same time flexible enough so that it will not be cracked or broken.

It is not to be understood that our invention is limited to the use of the material to be hereinafter described in the particular connection above mentioned. As will be apparent from the more detailed description of the material and its qualities which will follow, it might be used in other situations for the purpose of deadening sounds or as a heat insulator. Still other uses might be found for a material the qualities of which are compressibility, elasticity, uniformity in its felt-like structure, together with toughness of texture and a superficial hardness and density which, however, does not preclude a certain desirable flexibility.

A further object of the invention is economy of production. We contemplate more particularly the use as a raw material, of eel grass (*Zostera marina*), the supply of which is practically unlimited. The methods provided for treating the material are simple, and, as a consequence, the product may be manufactured at a very low cost.

Our invention consists in material having the qualities above described, and in the novel and improved methods by which such material is produced.

The preferred method of manufacture is as follows:

The fibrous vegetable material, the eel grass, is first cooked in an alkaline solution, preferably a two per cent. solution of caustic soda, either in the atmosphere or under steam pressure. The material is so treated for a period of from one to six hours, depending on the temperatures employed, until the fibrous parts of the plant are freed, to a large extent at least, from the pectic, resinous and nitrogenous matters. These last mentioned substances are then removed by any suitable treatment, for example, by washing. Preferably the material is suspended in a large volume of water and agitated either mechanically or by injecting compressed air into the vessel, after which the fibers are screened out.

The fibers are then rolled into sheets of any desired thickness. This operation produces a felt-like body which is of substantially uniform texture throughout, is relatively soft and compressible, and, at the same time, elastic so that when freed from a load imposed upon it it will resume its original shape.

For some purposes, however, for example, when the material is to be subjected to influences likely to tear or disintegrate it, it is rather too soft and is not tenacious enough to withstand such destructive influences.

In order to correct this the sheets are sprayed or brushed either on one side or on both sides with a dilute acid, preferably a two per cent. solution of sulfuric acid. This treatment causes the superficial fibers to become relatively hard and dense. Chemically it produces a hydrolization of the cellulose, changing it into hydro-cellulose. The result is the production, on one or each side of the sheet, of a relatively thin film or undefined stratum of material of a gelatinous character which, when it hardens by drying, is tough and yet at the same time, to a certain extent at least, flexible.

If it is desired to make the body of the sheet somewhat denser, tougher and harder, this may be accomplished by taking a portion of the fibers after they have been boiled in the alkaline solution and freed from the pectic, resinous and nitrogenous matter of the plant, and immersing the same in an acid bath, for example, in a diluted sulfuric acid solution. The material so treated, which, preferably, constitutes about thirty per cent. of the whole, after having been washed with water, is thoroughly mixed with the remaining seventy per cent. of material treated with the alkali alone, and then rolled or otherwise formed in sheets. These sheets are thereupon sprayed or brushed with acid in the manner and with the result above described. When this latter method is followed the proportion as between the material treated in the acid bath and that treated only in the alkaline bath may be varied to a considerable extent, depending upon the hardness and denseness required. The mixing may be done in any suitable manner, for example, by suspending the constituents in a large volume of water and agitating by compressed air or mechanically until the mixture is perfectly homogeneous, after which the water is drained off.

We claim:

1. The method of manufacturing a material of the character described, which consists in uniting the fibers of the plant *Zostera marina* in a felted coherent body, and treating said body superficially with an acid to produce a hard film, unitary with the rest of the material and of undefined depth.

2. The method of manufacturing a material of the character described, which consists in cooking plants of the species *Zostera marina* in an alkaline bath, separating out the non-fibrous constituents of the plants from the fibrous constituents, uniting the fibers in a coherent relatively soft and compressible body, and treating said body superficially with an acid so as to provide a thin coating of hydrolized fibers.

3. The method of manufacturing a material of the character described, which consists in cooking plants of the species *Zostera marina* in an alkaline bath, separating out the non-fibrous constituents of the plants from the fibrous constituents, immersing a portion of the fibers in a dilute acid bath, mixing the acid-treated fibers with fibers subjected to the alkaline treatment alone, forming the material so mixed into a coherent felt-like body, and treating said body superficially with an acid to hydrolize the fibers near the surface of the same.

HELON B. MacFARLAND.
ROBERT JAY SHOEMAKER.